United States Patent [19]

Peek et al.

[11] Patent Number: 4,607,976
[45] Date of Patent: Aug. 26, 1986

[54] BALL SOCKET ASSEMBLY

[75] Inventors: Brian R. Peek, Steger; Paul M. Sutenbach, Chicago, both of Ill.

[73] Assignee: Illinois Tool Works Inc., Chicago, Ill.

[21] Appl. No.: 744,361

[22] Filed: Jun. 13, 1985

[51] Int. Cl.[4] .......................... F16C 11/00; F16D 1/12
[52] U.S. Cl. ...................... 403/77; 403/141; 403/143
[58] Field of Search ............... 403/77, 76, 141, 143, 403/172

[56] References Cited

U.S. PATENT DOCUMENTS 4,084,913 4/1978 Schenk .................................. 403/141
4,111,570 9/1978 Morel ............................. 403/141 X Primary Examiner—Andrew V. Kundrat
Attorney, Agent, or Firm—J. P. O'Brien; T. W. Buckman

[57] ABSTRACT

A ball socket assembly is constructed of a plastic molded housing and a locking member. The plastic molded housing has a ball socket integrally formed on its bottom wall in the form of a base member having a spherical-shaped internal wall segment which faces an opening in the housing and having a pair of resilient arm members integrally formed with the base segment. The resilient arm members extend generally parallel to and equidistant from the axis drawn through the center of the spherical-shaped wall segment. Each of the resilient arm members have a curved internal face which matches the curvature of the spherical-shaped wall segment. A locking member can be selectively installed to prevent outward flexing of the resilient arm members after a spherical ball-headed screw has been installed into the ball socket.

7 Claims, 10 Drawing Figures

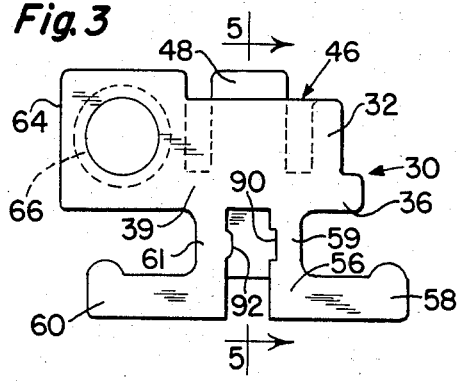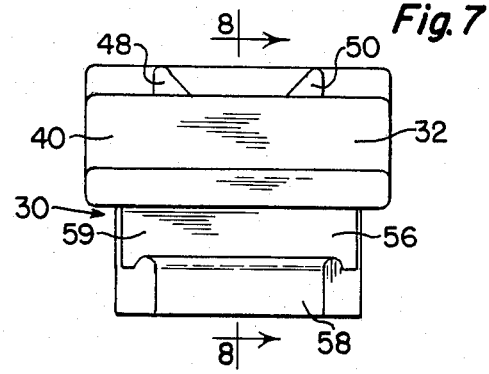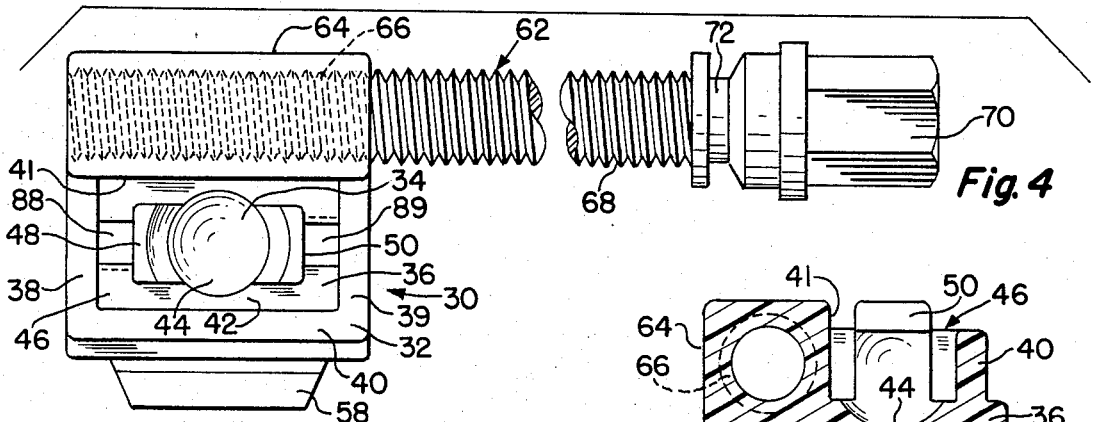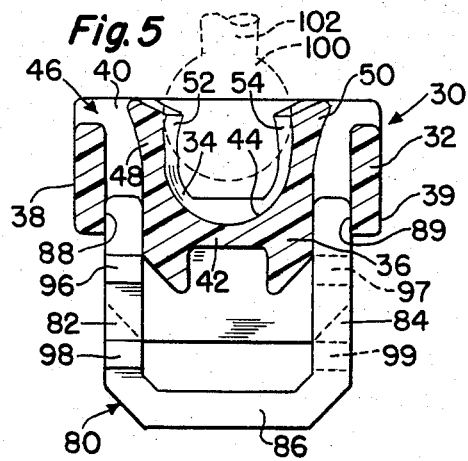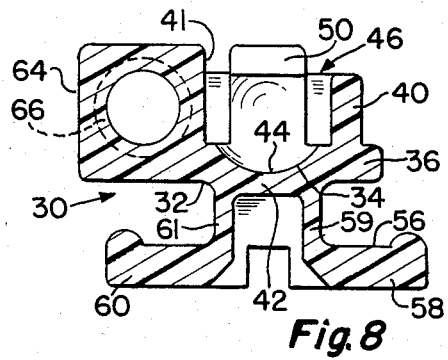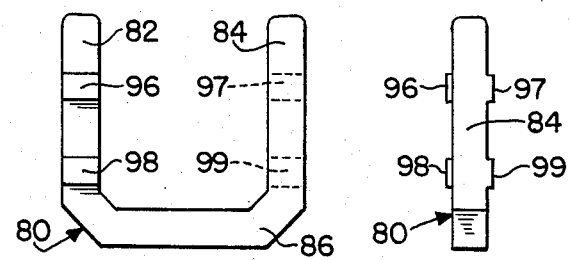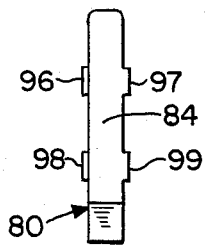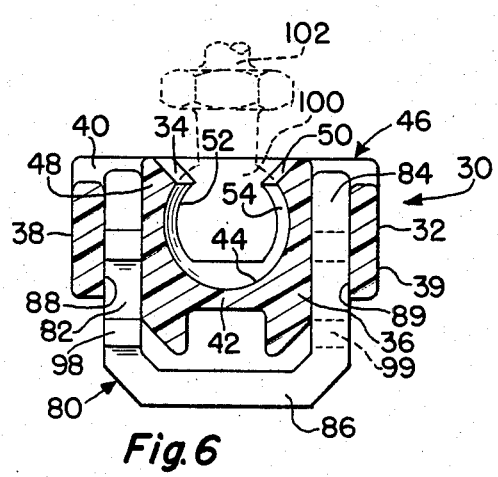

4,607,976

BALL SOCKET ASSEMBLY

BACKGROUND OF THE INVENTION

This invention relates to a ball socket assembly and in particular to a ball socket assembly for use in adjustably mounting a vehicle head lamp.

There is described in U.S. Pat. No. 4,188,655, which issued to Tallon et al, a vehicle head lamp mounting assembly which has three peripherally spaced integrally formed mounting ball joints for providing three suspension points from which the lamp is pivotally mounted for independent adjustment from two of the points for limited pivotal rotative movement about a pair of coplanar, orthogonally related and intersecting axes. The ball socket assembly of this invention is designed to be used in such a head lamp mounting assembly, and has several distinct advantages over the pivotal mounting arrangement described in the Tallon et al patent including a means for quickly installing the socket assembly and for locking the ball-headed screw in the ball socket once it is installed in the socket assembly.

A ball socket assembly constructed in accordance with the principles of this invention comprises a plastic molded housing, a ball socket integrally formed on the bottom wall of the housing and including a base member having a spherical-shaped internal wall segment facing an opening of the housing, and a pair of resilient arm members integrally formed with the base segment and extending generally parallel to and equidistant from the axis drawn through the center of the spherical-shaped wall segment. Each of the resililent arm members have a curved internal face which matches the curvature of the spherical-shaped wall segment. A locking means is provided for rigidly preventing further outward flexing of the resilient arm members after a spherical ball has been installed in the ball socket.

DESCRIPTION OF THE DRAWINGS

For a better understanding of this invention, reference may be made to the accompanying drawing, in which:

FIG. 3 is a rear elevational view of the socket assembly embodying the principles of this invention;

FIG. 4 is a top elevational view of the ball socket assembly illustrated in FIG. 3;

FIG. 5 is a cross sectional view of FIG. 3 taken along the lines 5—5 and looking in the direction of the arrows, and modified to show a locking member in the pre-assembled position;

FIG. 6 is identical to cross sectional view of FIG. 5 with the exception that the locking member is illustrated as being completely installed into the locking position;

FIG. 7 is a side elevational view of FIG. 3 taken from the right side thereof;

FIG. 8 is a cross sectional view of the ball socket assembly depicted in FIG. 7 taken along the line 8—8 and looking in the direction of the arrows;

FIG. 9 is a front elevational view of a locking member used in connection with the ball socket assembly as illustated in FIGS. 5 and 6; and FIG. 10 is a side elevational view of FIG. 9 taken from the right side thereof.

DESCRIPTION OF PREFERRED EMBODIMENT

Figure 1:
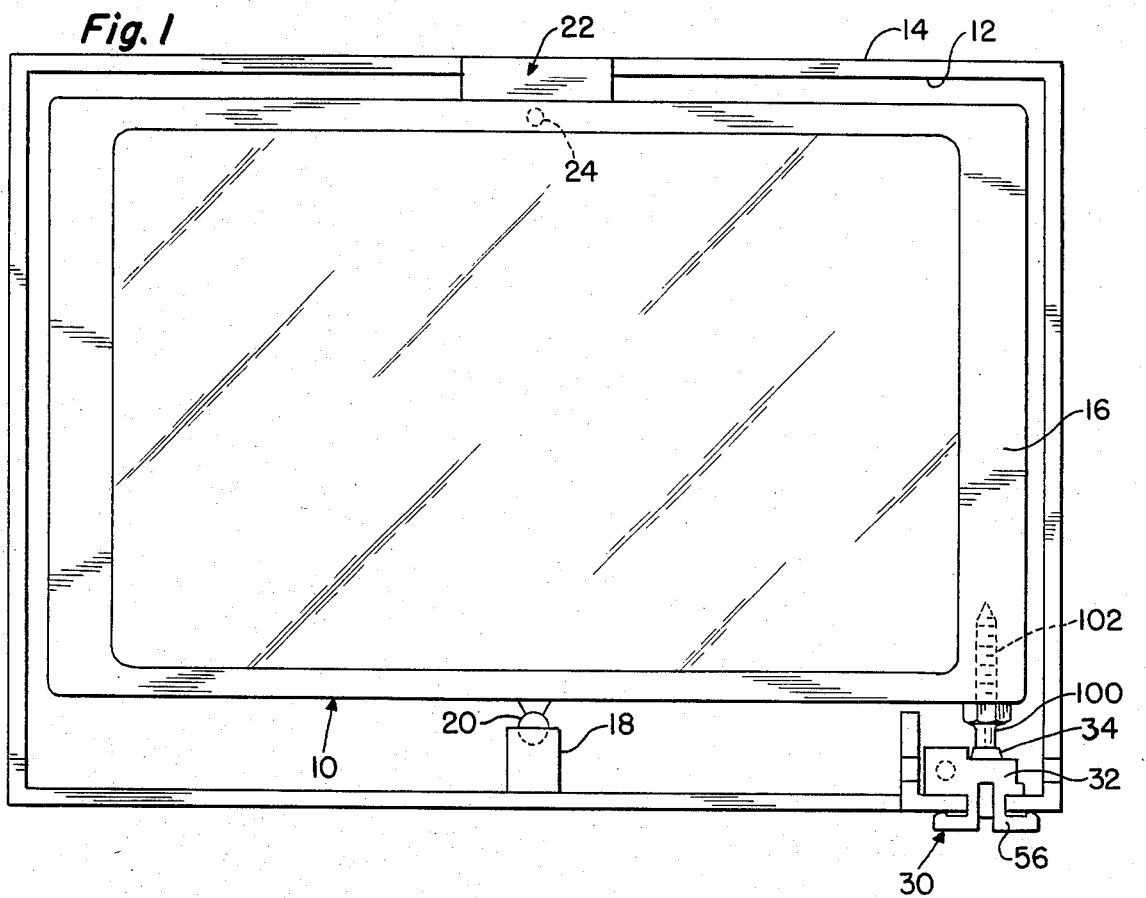
FIG. 1 is a front elevational view of a head lamp unit and mounting assembly which is adjustably mounted by a ball socket assembly constructed in accordance with principles of this invention.
Figure 2:
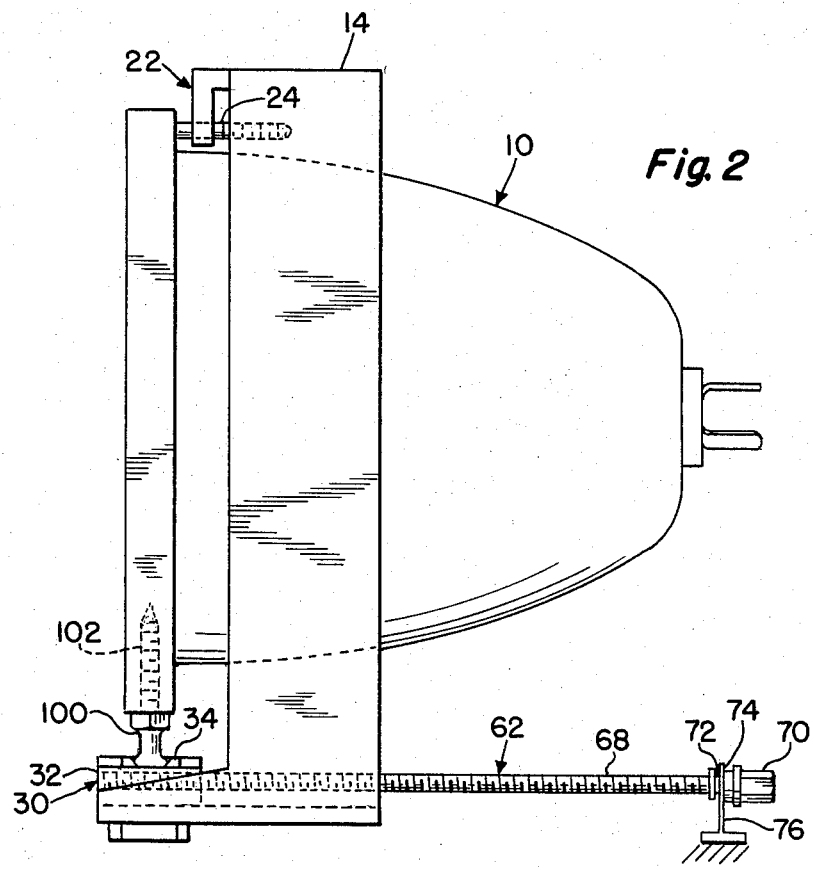
FIG. 2 is a side elevational view of FIG. 1, taken from the right side thereof.

There is illustrated in FIGS. 1 and 2, a head lamp unit 10 which is depicted as a rectangular head lamp. Head lamp 10 is mounted in a generally simularly shaped opening 12 in a head lamp mounting panel 14, which is affixed to or forms a part of the forward portion of a motor vehicle. Lamp unit 10, which may be of the sealed beam or separate bulb variety.

Lamp unit 10 is adjustably mounted by a three point suspension mounting arrangement connected to the rectangular frame 16. The three point suspension mounting arrangement depicted in FIGS. 1 and 2 are utilized in substantially the same manner as described in U.S. Pat. No. 4,188,655 and form no part of this invention. The lower center pivot mounting unit 18 provides universal motion via ball 20 to permit universal movement of lamp unit 10.

The upper pivot mounting unit 22 likewise has a ball socket to provide universal movement (not shown) and an adjustment means 24 to change the angular orientation of the lamp unit 10 about a vertical axis formed through pivot 20.

Ball socket assembly 30 depicted in the lower right hand portion of FIG. 1 illustrates the preferred embodiment of this invention. It will be appreciated that ball socket assembly 30 is shown with lamp unit 10 for illustration purposes only.

Ball socket assembly 30 has a plastic molded housing 32. A ball socket 34 is integrally formed on the bottom wall 36 of the housing 32. Housing 32 has a generally rectangular shape constructed by four side walls 38, 39, 40 and 41 integrally formed with bottom wall 36. The top of housing 32 is open at 46.

Ball socket 34 is integrally formed on bottom wall 36. Ball socket 34 has a base member 42 having a spherical-shaped internal wall segment 44 facing opening 46 and the top of housing 32.

A pair of resilient arm members 48 and 50 are integrally formed with base member 42. Each of resilient arm members 48, 50 have a curved internal face surface 52 and 54, respectively, which matches the curvature of the spherical-shaped wall segment 44.

The housing 32 is supported by pedestal 56. Pedestal 56 has a pair of L-shaped mounting feet 58 and 60 to permit the ball socket assembly 30 to be slidingly mounted on mounting panel 14.

Ball socket assembly 30 can be moved forwardly or rearwardly of the mounting panel 14 (FIG. 2) by virtue of the threaded screw mechanism 62, as depicted in FIG. 4. Threaded screw mechanism 62 consists of an integrally formed rectangular block 64 having a central threaded bore 66 extending lengthwise of the rectangular block 64. An elongate threaded screw 68 is in threaded engagement with bore 66. Threaded screw 68 has a drive head 70 and adjacent to the drive head 70 is an annular groove 72 which is rotatively mounted in the eyelet 74 of stationary support bracket 76 (FIG. 2).

One of the novel features of this invention is a means for locking a ball head in the ball socket 34. This locking means is provided by a locking member 80, which as depicted in FIG. 9 as having a generally U-shaped configuration with a pair of generally parallel extending finger elements 82 and 84 which are integrally connected to bight portion 86. Locking member 80 is installed into the housing 32 through a pair of apertures 88 and 89 through the bottom wall 36. The apertures 88 and 89 are spaced apart the same distance as finger elements 82 and 84 and are in direct alignment with the passageway between sidewall 38 and resilient arm member 48 and the passageway between sidewall 39 and resilient arm member 50.

The ball socket assembly 30 is designed with a means for holding the locking member 80 in a pre-assembled position as depicted in FIG. 5 to ensure that the locking member is not lost or misplaced prior to being completely installed in the housing 32. The means for holding the locking member 80 in a pre-assembled position is provided by a recess 90 and boss 92 (FIG. 3) formed in the parallel leg portions 59 and 61 of L-shaped mounting feet 58 and 60, respectively, which are formed in the opposing wall surfaces of 91 and 93 at opposite lateral ends of leg portions 59 and 61, respectively.

Locking member 80 has a pair of rectangular shaped bosses 96 and 97 which are integrally formed on the resilient arm portions 82 and 84, respectively, and which snap into recess 90 and boss 92 as locking member 80 is inserted into the housing 32 through apertures 88 and 89. The pre-assembled position of locking member 80 is depicted in FIG. 5. As can be seen from this figure, the arm portions 82 and 84 are below the resilient arm members 50 and 52 when in the pre-assembled position.

As depicted in FIG. 5, a spherical ball head 100 of a ball-headed screw 102 (FIG. 2) can be readily snapped into locking socket 30 by a downward pushing force against the upper end portion of resilient arm members 50 and 52, which causes the arm members to spread apart for entry of ball 100.

Once the ball is inserted into the ball socket as depicted in FIG. 6 the locking member 80 is then pushed upwardly through the apertures 88 and 89 to wedge between the side walls 38 and 39 of housing 32 and the resilient arm members 48 and 50.

To retain the locking member 80 in the locking position of FIG. 6, a means is provided for retaining it within the housing 32. This means is the result of the cooperation between a second pair of rectangular shaped bosses 98 and 99 on arms 82 and 84, respectively which snap into the recesses 90 and 92.

To remove ball 100 from the ball socket assembly 30, it is necessary to first pry the locking member 80 out of the retaining position (FIG. 6) to the pre-assembled position (FIG. 5) and pull outwardly on the ball headed screw 102 until the resilient arm members 48 and 50 flex outwardly a sufficient amount to release it.

From the foregoing description, it will be appreciated that the ball socket assembly 30 permits and quick installation and removal of the ball headed screw 102 and allows for a very accurate means of aligning the lamp unit 16 about the vertical axis extending through pivot 20. All that is necessary to change this angular orientation is to turn socket head 70 of elongate screw 62. Because screw 62 is held in a stationary position (the rotative action of collar 74 in the stationary bracket 76), the rotation of socket 70 causes housing 32 to move longitudinally along screw 62.

We claim:

1. A ball socket assembly comprising a plastic molded housing, a ball socket integrally formed in said housing, said ball socket including a base member having spherical-shaped internal wall segment facing an opening in said housing, and a pair of resilient arm members integrally formed with said base segment and extending generally parallel to and equidstant from the axis through the center of said spherical shaped wall segment, each of said resilient arm members having a curved internal face surface which matches the curvature of said spherical-shaped wall segment and locking means for rigidly preventing outward flexing of said resilient arm members after a spherical ball has been installed into said ball socket a pedestal integrally formed downwardly from the bottom wall of said base member, said pedestal comprising a pair of oppositely extending elongate L-shaped feet for permitting said ball socket assembly to be slidingly mounted along a straight path, and an elongate rectangular block integrally formed with said plastic molded housing and having a threaded bore formed through said rectangular block in a parallel direction to said straight path.

2. A ball socket assembly as defined in claim 1, wherein said housing includes a pair of sidewalls extending outwardly of and parallel to said resilient arm members, a pair of apertures formed through said housing in alignment with the space between one of said pair of resilient arm members and one of said pair of sidewalls, and wherein said locking means comprises a U-shaped locking member having a pair of generally extending parallel finger elements which are spaced apart a distance equal to the distance between said pair of apertures, each of said pair of finger elements having a transverse dimension equal to the distance between one of said resilient arm members and the adjacent one of said pair of sidewalls.

3. A ball socket assembly as devined in claim 2, further comprising means for retaining said U-shaped locking member in a pre-assembled position where said pair of finger elements extend through said pair of apertures but below the portion of said resilient arm members which flex outwardly.

4. A ball socket assembly as defined in claim 2, further comprising means for retaining said locking member in the assembled position.

5. A ball socket assembly comprising a plastic molded housing, a ball socket integrally formed on the bottom wall of said housing, said socket including a base member having a spherical shaped internal wall segment facing an opening in the top wall of said housing, and a pair of resilient arm members integrally formed with said base segment and extending generally parallel to and equidistant from the axis drawn through the center of said spherical shaped wall segment, each of said resilient arm members having a curved internal face which matches the curvature of said spherical-shaped wall segment, said housing having a pair of sidewalls integrally formed with said bottom wall disposed outwardly of said pair of resilient arm members, and having a pair of apertures formed through said bottom wall, each of said pair of apertures being disposed between one of said pair of sidewalls and one of said pair of resilient arm members, and a locking member including a pair of spaced apart finger elements spaced apart a distance equal to the distancae between said pair of apertures, the shape and thickness of each of said finger elements matching size and shape of the space between said one of said pair of sidewalls and said one of said pair of resilient arm members after a spherical ball has been installed into said ball socket a pedestal integrally formed downwardly from the bottom wall of said base member, said pedestal comprising a pair of oppositely extending elongate L-shaped feet for permitting said ball socket assembly to be slidingly mounted along a straight path, and an elongate rectangular block integrally formed with one of said sidewalls of said plastic molded housing and having a threaded bore formed through said rectngular block in a parallel direction to said straight path.

6. A ball socket assembly as defined in claim 5, further comprising means for retaining said locking member in a pre-assembled position where said pair of finger elements extend through said pair of apertures but below the portion of said resilient arm members which flex outwardly.

7. A ball socket assembly as defined in claim 5, further comprising means for retaining said locking member in the assembled position.

* * * * *